Sept. 3, 1946.　　　D. P. COOPER, JR　　　2,406,742
MOLD FOR USE IN THE MANUFACTURE OF OPTICAL ELEMENTS
Filed Sept. 2, 1942
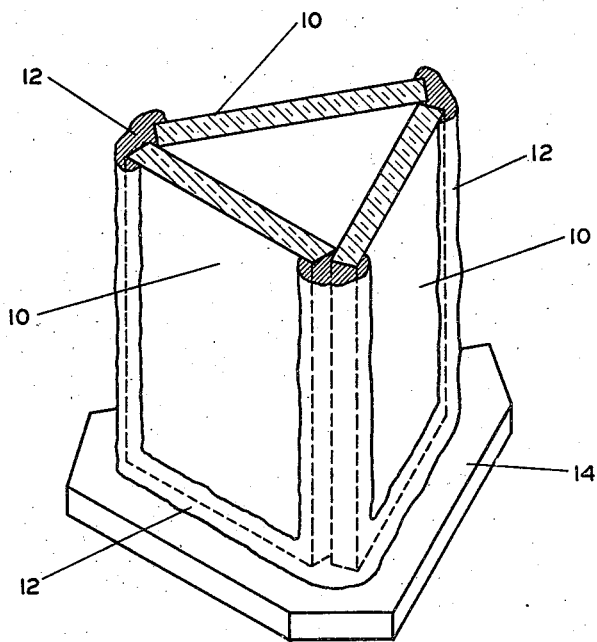
Dexter P. Cooper, Jr.
INVENTOR.
BY Donald C. Brown
Attorney Patented Sept. 3, 1946

2,406,742

UNITED STATES PATENT OFFICE 2,406,742

MOLD FOR USE IN THE MANUFACTURE OF OPTICAL ELEMENTS

Dexter P. Cooper, Jr., Cambridge, Mass., assignor to Polaroid Corporation, Cambridge, Mass., a corporation of Delaware Application September 2, 1942, Serial No. 457,032

13 Claims. (Cl. 18—34)

This invention relates to an improved mold for use in the manufacture of optical elements formed of polymerized synthetic plastics, resins and like materials.

An object of the invention is to provide a mold of the character described comprising a plurality of elements having optically smooth molding surfaces and a relatively low melting-point cement for sealing the joints between said molding elements and holding them fixedly in position during the molding process.

Another object of the invention is the provision of a fusible cement which remains hard at temperatures at which the polymerization process takes place.

Other objects of the invention will in part be obvious and will in part appear hereinafter.

The invention accordingly comprises the product possessing the features, properties, and relation of elements which will be exemplified in the following detailed disclosure and the scope of the application of which will be indicated in the claims.

For a fuller understanding of the invention reference should be had to the following detailed description taken in connection with the accompanying drawing, which represents partially in perspective and partially in section one embodiment of the invention.

There is today a pressing demand for large quantities of optical elements, such as prisms, lenses and the like. This invention is concerned with the provision of molds adapted for use in the production of such elements from synthetic plastic or resinous materials which are introduced into the mold in a partially polymerized or monomeric state and then polymerized substantially completely and until they form hard, transparent optical elements. Materials which have been found particularly useful in the production of such molded plastic optical elements are cyclohexyl methacrylate, styrene, methyl methacrylate and similar materials.

A considerable percentage of the cost of the molded optical element resides in the cost of the mold. The light-transmitting surfaces of the element are preferably molded in contact with glass elements having optically smooth surfaces, and these are expensive. It will be apparent that in the production of large quantities of molded optical elements it is highly desirable that the mold may be readily and rapidly assembled and that it should be easily removed from the finished article. It should comprise elements, and particularly those elements having optically smooth surfaces, which can be repeatedly re-used, and these elements should preferably be bonded together and maintained in proper position by an adhesive or a cement which may be readily applied, easily removed, and which will stand the temperatures to which the molds are subjected during the polymerization of the plastic material therein. With plastic materials of the class heretofore described polymerization temperatures are preferably maintained not greatly in excess of 90 degrees C.

This invention contemplates the use of a fusible cement, and preferably one having a relatively low melting point as the material employed in sealing and bonding together the mold walls. The mold may be assembled by placing the glass wall elements in a suitable jig, and while they are held in position in the jig, for example by leaf springs or other means, they are sealed along their adjacent edges and cemented together by applying thereto the preferred adhesive or cement in molten condition. The cement may then be cooled and it quickly sets and hardens.

The drawing illustrates in perspective a portion of a mold for use in the manufacture of prisms. The mold walls 10 are shown as made of glass, the preferred material, and they are bonded together and held in position by the fusible cement 12. A bottom plate 14 is also held in position by the cement 12.

A preferred material for use as the bonding material in the present invention is a relatively low melting-point alloy, such as the alloy known as Wood's metal, or the alloy known as Rose's metal. Any other fusible cement may be employed provided it fuses at a temperature above, but not greatly above, the temperatures employed in effecting substantial polymerization of the molded plastic. A fusible cement having a melting point not greatly in excess of 90 degrees C. is preferred. Such a cement may be poured around the mold joints without injury to the glass mold walls and it may be readily removed from the mold, melted and re-used, the removal being accomplished at a temperature which does not injure the molded plastic.

Since certain changes may be made in the above product and different embodiments of the invention could be made without departing from its scope, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. A mold for use in the formation of an optical element of polymerized synthetic plastic material or the like, comprising, in combination, a plurality of mold walls having molding surfaces substantially optically smooth, and a cement bonding said walls together and comprising Wood's metal.

2. A mold for use in the formation of an optical element of polymerized synthetic plastic material or the like, comprising, in combination, a plurality of mold walls having molding surfaces substantially optically smooth, and a cement bonding said walls together and comprising Rose's metal.

3. A mold for use in the formation of an optical element of polymerized synthetic plastic material or the like, comprising, in combination, a plurality of mold walls having molding surfaces substantially optically smooth and defining the outer surfaces of the mold cavity, and a cement bonding said walls together and comprising an alloy having a melting point not greatly in excess of 90 degrees C.

4. A mold for use in the formation of an optical element of polymerized synthetic plastic material or the like, comprising, in combination, a plurality of substantially flat, glass mold walls having molding surfaces substantially optically smooth, and a cement bonding said walls together and comprising an alloy having a melting point not greatly in excess of 90 degrees C.

5. A mold for use in the formation of an optical element of polymerized synthetic plastic material or the like which formation is effected at a temperature not exceeding a predetermined temperature, said mold comprising, in combination, a plurality of substantially flat, glass mold walls having molding surfaces substantially optically smooth, and a fusible cement bonding sadi walls together, said cement having a melting point not greatly in excess of said predetermined temperature.

6. A mold for use in the formation of an optical element of polymerized synthetic plastic material or the like which formation is effected at a temperature not exceeding a predetermined temperature, said mold comprising, in combination, a plurality of mold walls having molding surfaces substantially optically smooth and defining the outer surfaces of the mold cavity, and a fusible cement bonding said walls together, said cement having a melting point not greatly in excess of said predetermined temperature.

7. A mold for use in the formation of an optical element of polymerized synthetic plastic or the like, comprising, in combination, a plurality of glass mold walls having molding surfaces substantially optically smooth, and a cement bonding said walls together and comprising Wood's metal.

8. A mold for use in the formation of an optical element of polymerized synthetic plastic material or the like, comprising, in combination, a plurality of glass mold walls having molding surfaces substantially optically smooth, and a cement bonding said walls together and comprising Rose's metal.

9. A mold for use in the formation of an optical prism of polymerized synthetic plastic material or the like, comprising, in combination, a plurality of substantially flat glass mold walls having molding surfaces substantially optically smooth and forming a prismatic molding cavity, and a cement bonding said walls together and comprising Wood's metal.

10. A mold for use in the formation of an optical prism of polymerized synthetic plastic material or the like, comprising, in combination, a plurality of substantially flat glass mold walls having molding surfaces substantially optically smooth and forming a prismatic molding cavity, and a cement bonding said walls together and comprising Rose's metal.

11. A mold for use in the formation of an optical element of polymerized synthetic plastic or the like, which formation is effected at a temperature not exceeding a predetermined temperature, said mold comprising a plurality of mold members, at least one of said members being formed of glass and having an optically smooth surface adapted to define a light-transmitting surface of said element, and a fusible cement bonding said members together, said cement having a melting point not greatly in excess of said predetermined temperature.

12. A mold for use in the formation of an optical element of polymerized synthetic plastic material or the like, comprising, in combination, a plurality of mold members, at least one of said members being formed of glass and having an optically smooth surface adapted to define a light-transmitting surface of said element, and a cement bonding said members together and comprising a metallic alloy having a melting point not greatly in excess of 90° C.

13. A mold for use in the formation of an optical element of polymerized synthetic plastic material or the like, comprising, in combination, a plurality of glass mold walls having molding surfaces substantially optically smooth and defining a prismatic molding cavity, and a cement bonding said walls together and comprising a metallic alloy having a melting point not greatly in excess of 90° C.

DEXTER P. COOPER, Jr.